(12) United States Patent
Romano et al.

(10) Patent No.: US 10,694,735 B2
(45) Date of Patent: *Jun. 30, 2020

(54) LAND ANIMAL TRAP AND BARRIER

(71) Applicants: Chris Romano, Benton, LA (US);
Chloë Romano, Benton, LA (US)

(72) Inventors: Chris Romano, Benton, LA (US);
Chloë Romano, Benton, LA (US)

(*) Notice: Subject to any disclaimer, the term of this patent is extended or adjusted under 35 U.S.C. 154(b) by 163 days.

This patent is subject to a terminal disclaimer.

(21) Appl. No.: 15/620,071

(22) Filed: Jun. 12, 2017

(65) Prior Publication Data

US 2017/0354138 A1 Dec. 14, 2017

Related U.S. Application Data

(60) Provisional application No. 62/348,244, filed on Jun. 10, 2016.

(51) Int. Cl.
*A01M 23/00* (2006.01)
*A01M 23/34* (2006.01)
*A01M 29/00* (2011.01)
*A01M 29/30* (2011.01)
*A01M 29/12* (2011.01)
*A01M 31/00* (2006.01)
*A01M 99/00* (2006.01)

(52) U.S. Cl.
CPC ............ *A01M 23/00* (2013.01); *A01M 23/34* (2013.01); *A01M 29/12* (2013.01); *A01M 29/30* (2013.01); *A01M 31/002* (2013.01); *A01M 99/00* (2013.01)

(58) Field of Classification Search
CPC ...... A01M 23/34; A01M 23/00; A01M 29/00; A01M 29/30
USPC .................. 43/85–87, 58, 64, 65; 52/101
See application file for complete search history.

(56) References Cited

U.S. PATENT DOCUMENTS

| | | | | |
|---|---|---|---|---|
| 4,301,996 A | * | 11/1981 | Holyoak | A01G 13/105 256/1 |
| 4,449,316 A | * | 5/1984 | Moorhead | A01M 23/08 256/1 |
| 7,562,453 B1 | * | 7/2009 | Benner | A01G 13/10 256/1 |
| 9,237,743 B2 | * | 1/2016 | Gaskamp | A01M 23/22 |

OTHER PUBLICATIONS kwalitynets.com (Bird Protection Net. Catalog [online]. Kwality Nets Mfg Co., 2007. [retrieved on Oct. 22, 2019]. Retrieved from the Internet: <URL: https://web.archive.org/web/20071114090710/https://www.kwalitynets.conn/bird-protection-net.html>) (Year: 2007).*

* cited by examiner

*Primary Examiner* — Darren W Ark
*Assistant Examiner* — Steven J Shur
(74) *Attorney, Agent, or Firm* — Davis & Bujold PLLC; Charles Holoubek (57) ABSTRACT

A land animal snare barrier comprising a netting having a first layer and a second layer. The first layer defines a first plurality of through holes of a first size. The second layer defines a second plurality of through holes of a second size.

18 Claims, 5 Drawing Sheets

LAND ANIMAL TRAP AND BARRIER

CROSS REFERENCE TO RELATED APPLICATIONS/PRIORITY

The present invention claims priority to U.S. Provisional Patent Application No. 62/348,244 filed Jun. 10, 2016, which is incorporated by reference into the present disclosure as if fully restated herein. Any conflict between the incorporated material and the specific teachings of this disclosure shall be resolved in favor of the latter. Likewise, any conflict between an art-understood definition of a word or phrase and a definition of the word or phrase as specifically taught in this disclosure shall be resolved in favor of the latter.

BACKGROUND OF THE INVENTION

Snakes and rodents readily traverse boundaries that effectively keep out larger mammals and humans, like cyclone fences and rote iron fences. There is a current and seemingly intractable need to for a barrier to deter and or catch different sized snakes and/or rodents, while preferably having minimal impact on the visual surroundings.

SUMMARY OF THE INVENTION

Wherefore, it is an object of the present invention to overcome the above mentioned shortcomings and drawbacks associated with the current technology. The present invention is directed to methods and apparatuses related to land animal snare barriers comprising a line of netting having a first layer and a second layer. The first layer has through holes of a first size. The second layer has through holes of a second size.

The disclosed invention is related to a land animal snare barrier comprising a netting having a first layer and a second layer, the first layer defining a first plurality of through holes of a first size, and the second layer defining a second plurality of through holes of a second size. According to a further embodiment the first size is preferably at least 20% larger than the second size, more preferably at least 50% larger than the second size, most preferably at least 100% larger than the second size. According to a further embodiment substantially all of through holes in the first layer are larger than substantially all of the through holes in the second layer According to a further embodiment the netting further comprises a third layer defining through holes of a third size. According to a further embodiment substantially all of the through holes in the first layer are larger than substantially all of the through holes in the second layer, and substantially all of the through holes of the second layer are larger than substantially all of the through holes of the third layer. According to a further embodiment the second layer is between the first layer and the third layer. According to a further embodiment the netting further comprises a fourth layer defining through holes of a fourth size. According to a further embodiment substantially all of the through holes in the first layer are larger than substantially all of the through holes in the second layer, substantially all of the through holes of the second layer are larger than substantially all of the through holes of the third layer, substantially all of the through holes of the third layer are larger than substantially all of the through holes of the third layer, the second layer is between the first layer and the third layer, and the third layer is between the second layer and the fourth layer. According to a further embodiment the first through holes are between 1 inch wide and ¾ inch wide, the second through holes are between ¾ inch wide and ½ inch wide, the third through holes are between ½ inch wide and ¼ inch wide, the fourth through holes are between ¼ inch wide and ⅛ inch wide. According to a further embodiment the first through holes may be one of between 1 inch wide and ¾ inch wide, between ¾ inch wide and ½ inch wide, between ½ inch wide and ¼ inch wide, and between ¼ inch wide and ⅛ inch wide, and the second through holes may be one of between 1 inch wide and ¾ inch wide, between ¾ inch wide and % inch wide, between ½ inch wide and ¼ inch wide, and between ¼ inch wide and ⅛ inch wide. According to a further embodiment, one or more vertical supports attach to the netting. According to a further embodiment, one or more ground attachments attach the netting to the ground. According to a further embodiment the netting is one of substantially transparent and substantially translucent. According to a further embodiment the first layer and the second layer are substantially continuously attached to one another along a length of the netting at a seam. According to a further embodiment the first layer and the second layer are each between 18 inches and 48 inches wide.

The disclosed invention further relates to a land animal snare barrier kit comprising a netting having a first layer and a second layer, with the first layer defining first through holes of a first size, the second layer defining second through holes of a second size, and the first size being larger than the second size, a vertical support, and a plurality of vertical attachments to attach the netting to the vertical support. According to a further embodiment, the kit includes one or more ground attachments to attach the netting to the ground. According to a further embodiment the one or more ground attachments is one of a weight, a lawn staple, and a stake. According to a further embodiment the netting further comprises a third layer defining third through holes of a third size, and the second size being larger than the third size, and the first layer, the second layer, and the third layer being substantially continuously connected to one another at a seam. According to a further embodiment the kit includes a netting sensor that detects and transmits alerts when an animal is snared in the netting.

The disclosed invention further relates to a method for blocking or snaring land animals comprising attaching a netting to a vertical support with vertical attachments along a perimeter to be protected, wherein the netting has a first layer and a second layer substantially continuously attached to one another along a seam, with the first layer defining first through holes of a first size, the second layer defining second through holes of a second size, and the first size being larger than the second size.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying figures in which.

DETAILED DESCRIPTION OF THE PREFERRED EMBODIMENTS

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carded out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)–(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Turning now to FIGS. 1-4, a brief description concerning the various components of the present invention will now be briefly discussed.

The present invention relates to methods and devices of a low visibility reptile barrier and rodent deterrent system, or a snare barrier 2. The snare barrier 2 comprises a portion netting 4 with a first layer 6 and a second layer 8. The snare barrier 2 of acts to entangle or "snare" different size reptiles such as skinks, monitors, snakes, dragons etc. in a way that makes it highly unlikely that the snakes will escape. The snare barrier deters small rodents such as squirrels, rats, marmots, prairie dogs, etc. Additionally; according to one embodiment, the snare barrier 2 remains highly unseen in the given environment in which it is installed, preferably having a minor to very minor visual impression/visual foot print. The netting 4 is preferably designed to trap and bind snakes of most to all sizes in a given ecosystem, lizards most sizes and deter rodents of all sizes by entangling their feet while disrupting their path of travel.

Figure 1:
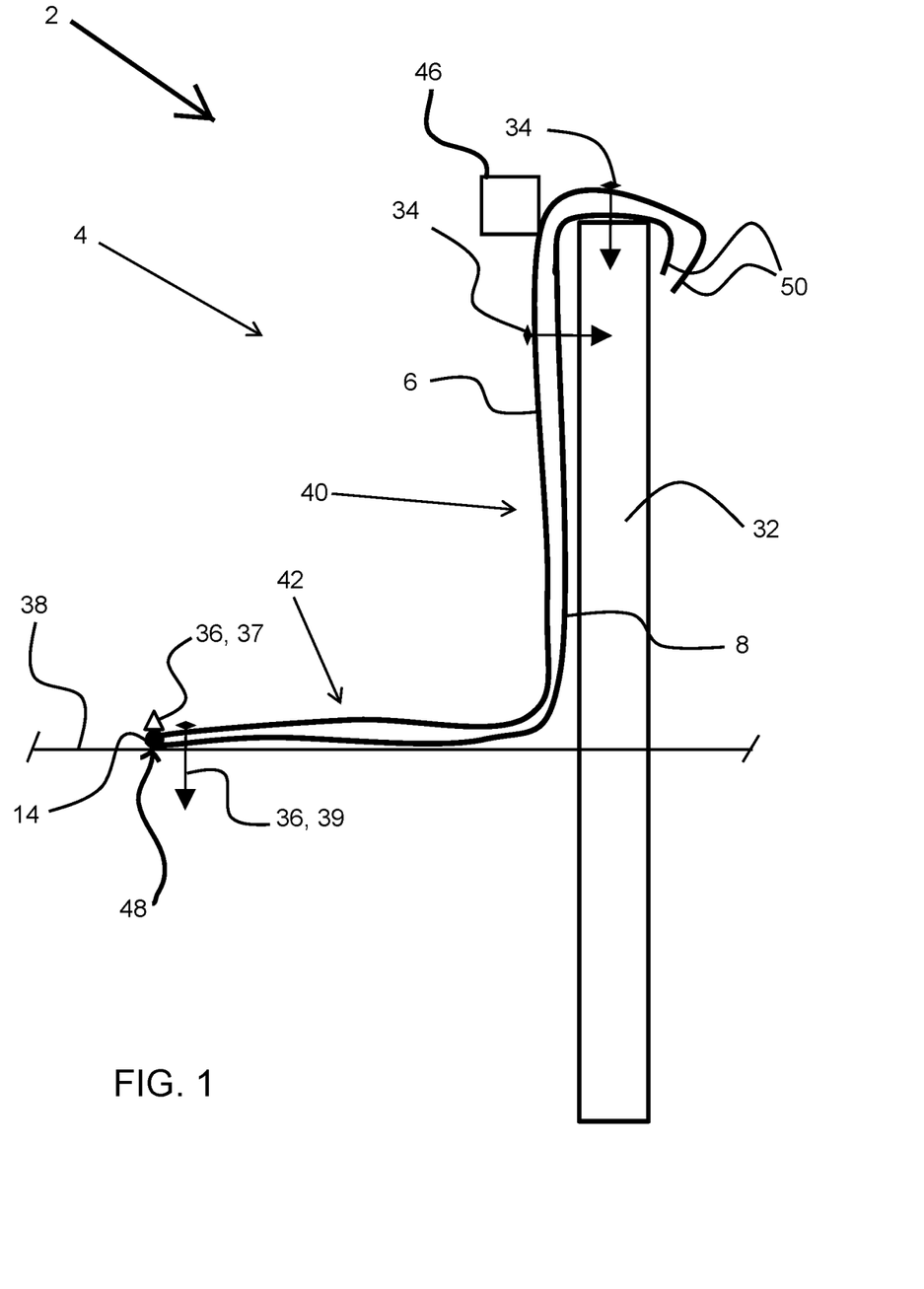
FIG. 1 is a cross section of a first embodiment of the snare barrier according to the present invention with two layers of netting attached to a wooden stake.
Figure 3:
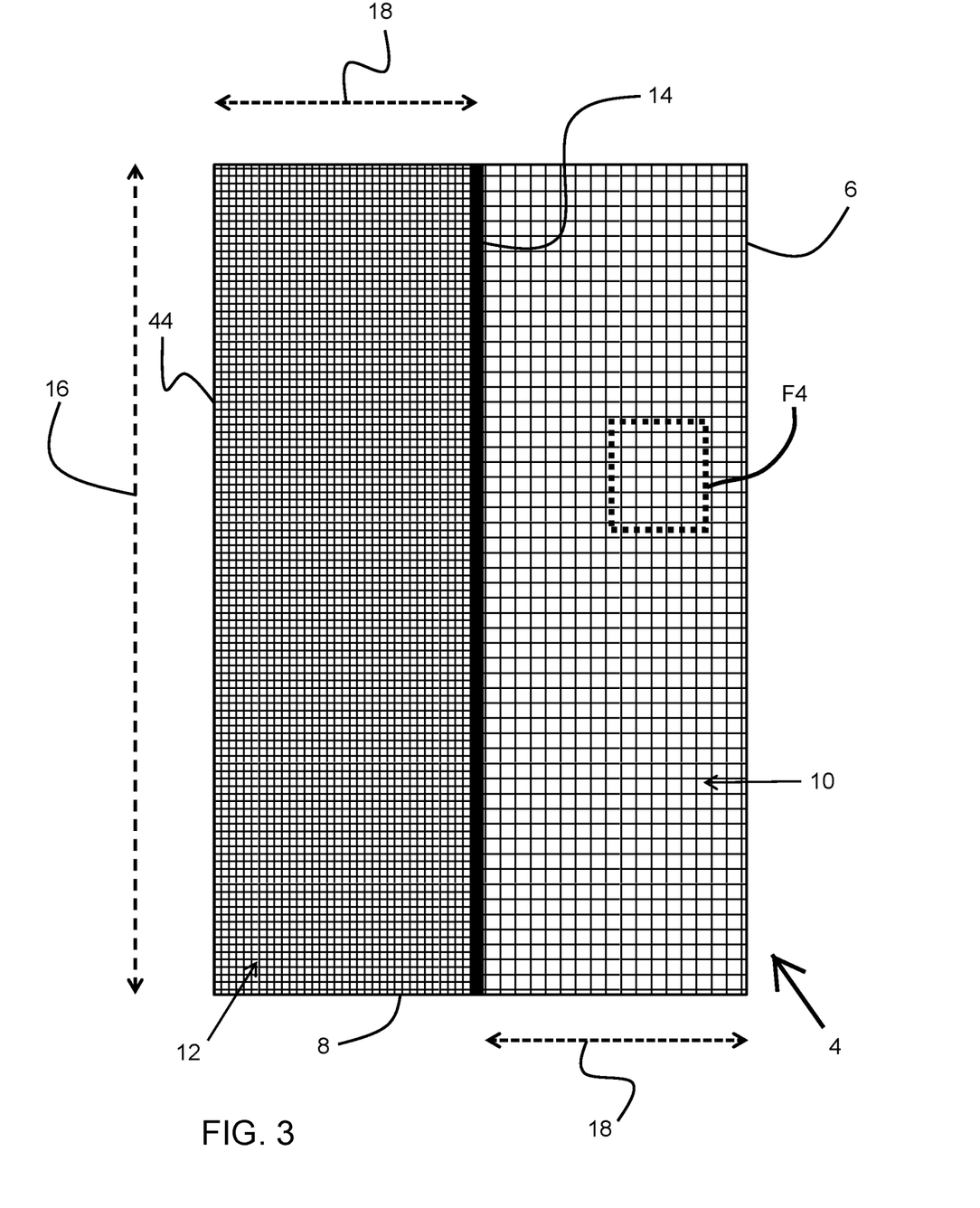
FIG. 3 is a top plan view of the netting in FIG. 1 laid out.
Figure 4:
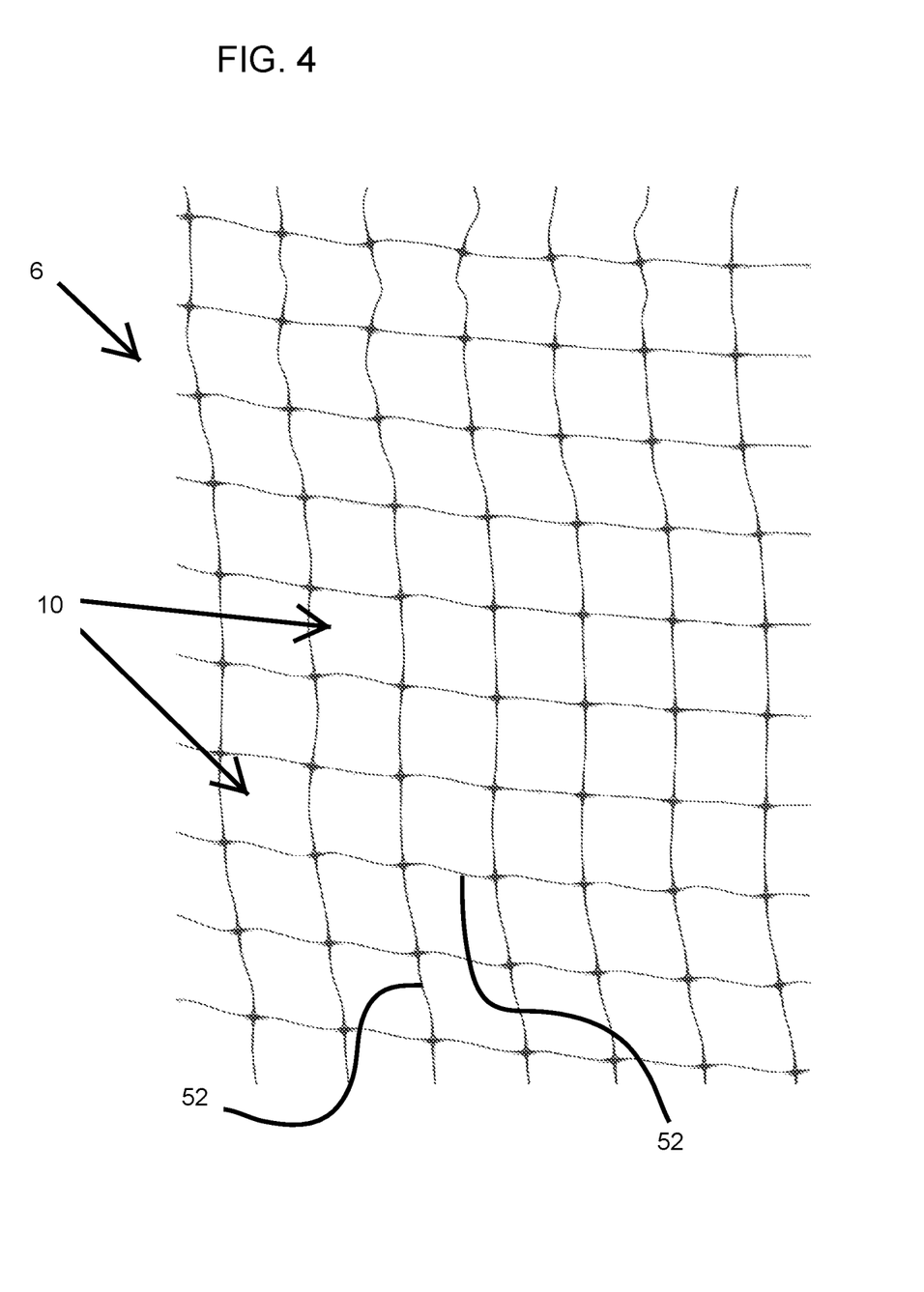
FIG. 4 is a partial close up view on the first layer of the netting of FIG. 3 in the dashed box F4.

The netting 4 is preferably in long strands with the first layer having or defining first through holes 10 of a first size and a second portion having second through holes 12 of a second size. The first layer 6 and the second layer 8 are preferably connected to one another along a preferably continuous first seam 14 and/or of unitary construction with one another. The strand of netting 4 is preferably elongate with a length 16 measuring preferably between 25 feet and 200 feet, more preferably between 50 feet and 150 feet, and most preferably around 100 feet. Each layer 6, 8 has a width 18 that preferably measures between 18 inches and 48 inches, more preferably between 20 inches and 42 inches, most preferably between 24 inches and 36 inches. The first layer 6 and the second layer 8 preferably are of substantially equal widths 18 and lengths 16. The first through holes 10 may vary in size, but are preferably are all larger than the largest second through holes 12. The second through holes 12 may vary in size, but are preferably all smaller than the smallest first through hole 10.

Figure 2:
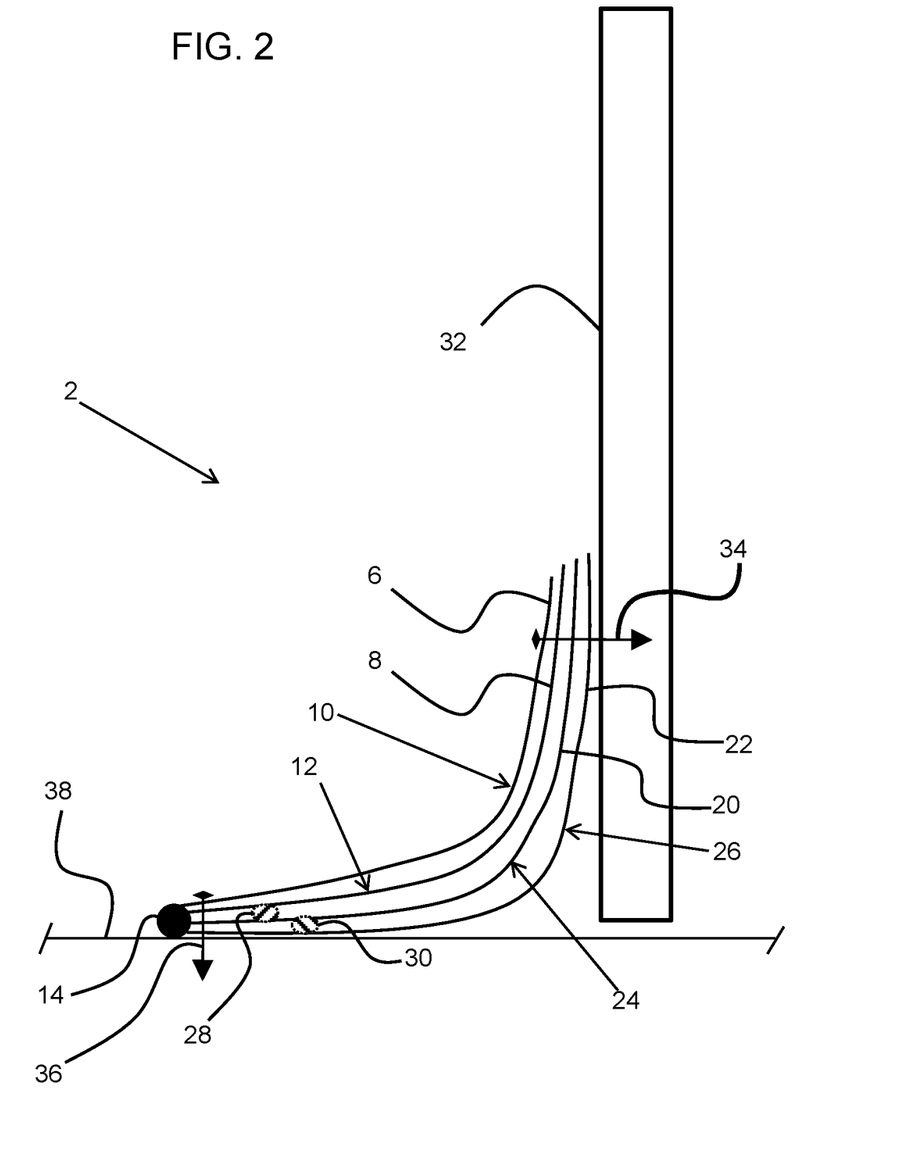
FIG. 2 is a cross section of a second embodiment of the snare barrier according to the present invention with four layers of netting attached to a wooden fence.
Figure 5:
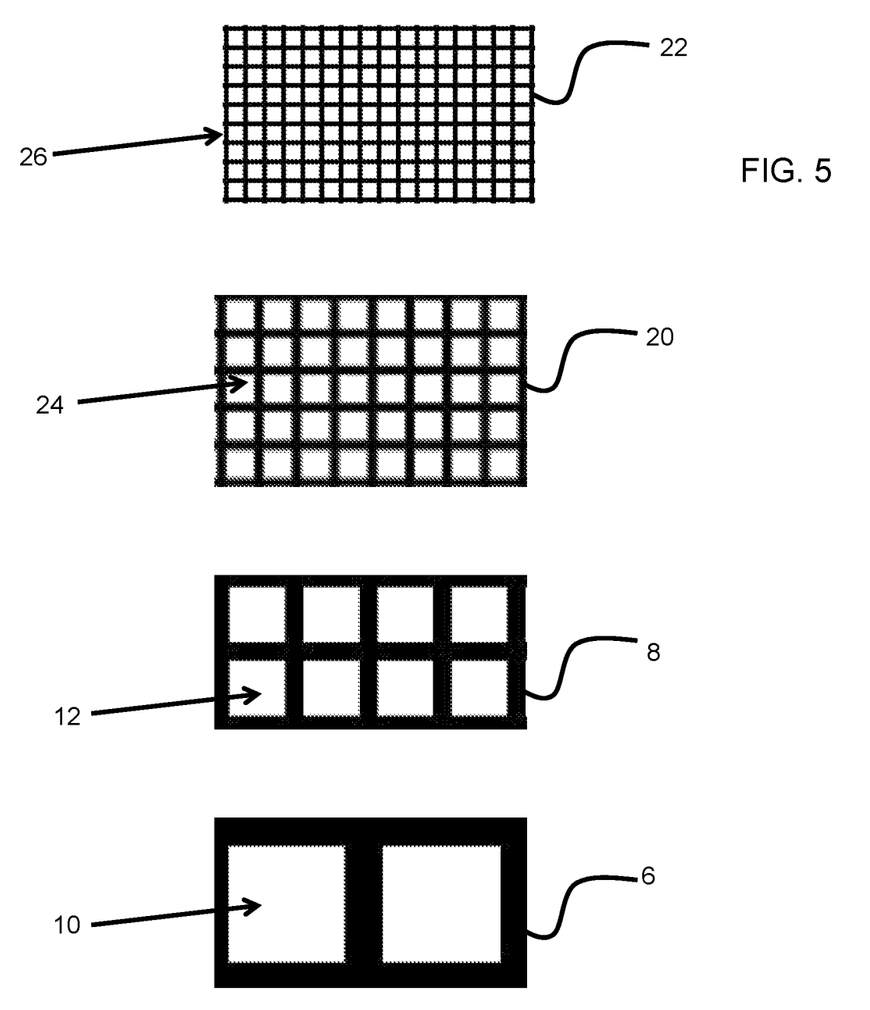
FIG. 5 is a view of exemplary first, second, third, and fourth layers according to the principles of the present disclosure.

Optionally a third layer 20 and/or a fourth layer 22 may also be included. The third layer 20 has third through holes 24 of a third size and the fourth layer 22 has fourth through holes 26 of a fourth size, as shown in FIG. 5. The third layer 20 is preferably connected to the first layer 6 and the second layer 8 along the first seam 14, or to one of the first layer 6 and the second layer 8 along a second seam 28 that is spaced from and runs parallel to the first seam 14. The fourth layer 22 is preferably connected to the first layer 6, the second layer 8, and the third layer 20 along the first seam 14, or to one of the first layer 6, the second layer 8, and the third layer 20 along a third seam 30 that is spaced from and parallel to the first seam 14. In a further embodiment, the first layer 6 and the second layer 8 are attached via the first seam 14, and the third layer 20 and the fourth layer 22 are attached via the third seam 30, with the third and fourth layers 20, 22 substantially separate from the first and second layers 6, 8, connected substantially only at a vertical support 32, The third layer 20 and the fourth layer 22 may also be unitary in construction with each other and/or with the first layer 6 and/or second layer 8. The third through holes 24 may be sized a same or different size then either or both of the first and the second through holes 10, 12. The fourth through holes 26 may be sized a same or different size than each or all of the first, the second, and the third through holes 10, 12, 24.

The invention preferably includes further elements in addition to the netting 4. According to some embodiments, proper setup of the snare barrier 2 is very important to the success of the snare barrier.

This type of netting 4 can also be used as a stand-alone trap if not used as the barrier system.

According to one embodiment, the snare barrier 2 comprises the netting 2, a vertical support 32, vertical attachments 34 to attach the netting 4 to the vertical support, and ground attachments 36 to attach the netting 4 to the ground 38. The vertical support 32 may include, for example, one or more metal, plastic, and/or wooden vertical rods, wooden stakes, and/or a fence, like a wooden or cyclone fence. The vertical support 32 supports a vertical portion 40 of the netting 4 in a substantially upright position. The vertical attachments 34 may include a zip tie, VELCRO®, fishing line type cord, staples, glue, adhesives, and other mechanical and/or chemical attachments. The vertical attachments 34 may also include one or more integrated flaps, ties, or pockets that are integrated to the netting 4 and attach to or fit around the vertical supports 32. The ground attachments 38 may include lawn staples 39, weights 37, tent like stakes, or other weighted and/or ground penetrating attachments. Chemical and or adhesive ground attachments 36 may also be used, especially in situations where some or all of the snare barrier 2 extends over rock or concrete ground 38. The ground attachments 38 facilitate at least a part of a horizontal portion 42 of the netting 4 maintaining contact with the ground 38.

According to one embodiment the snare barrier 2 could be sold in a kit. The kit would preferably include at least 1 section of 7 ft×100 ft clear (or same color as environment, for example) netting 4 (preferably available in multiple colors). The sizes and color could vary. The netting 4 would preferably comprise the first layer 6 and the second layer 8 attached at the first seam 14. The kit would also preferably include, for example, approximately 50 lawn staples 39 or other ground attachments 36. Alternatively, the netting 4 could have built in weights 37 along the length of the netting 4, preferably along the middle section or at the first seam 14 either continuously or around every 1 to 2 feet, for example, to function as the ground attachment 36 via gravity. The kit would also preferably include vertical attachments 34 such as approximately 25 zip ties or other means to attach the netting 4 to the vertical support 32. Alternatively, the netting 4 could have adhesive affixed along a length 16 of the netting, for example along a long edge 44 of the vertical portion 40 of the netting, to affix the netting 4 directly to a vertical support 32 such as a fence, and/or adhesive could be intermittently affixed along widths 18 of the netting 4 to affix the netting 4 directly to a vertical support 32 such as posts or rods. According to one embodiment, the kit could also include stakes or some other vertical support 32. According to other embodiments, the vertical support 32 might already be present at the user's property (e.g., a fence).

The netting 4 grid square design which defines the through holes 10, 12, 24, 26 is important to the snare barrier's 2 effectiveness of trapping or deterring a wide variety of rodents and reptiles.

A benefit of the netting 4 being translucent is that it remains substantially unseen. This netting 4 can also be produced in multiple colors to further satisfy a user's needs for low visibility while maintaining protection. For example, a user may prefer green netting 4 in an area where the user has a lot of green in the user's yard or tree line facing the woods. The snare barrier 2 can be an effective trap/barrier system while remaining substantially effectively invisible from afar and highly unseen up close.

The netting 4 may be used on the inside or outside of fence lines if used in barrier fashion. Also the netting 4 can be used as a standalone trap in areas a user wishes to protect from reptiles such as snakes of all sizes.

In other embodiments, the snare barrier 2 may include an netting sensor 46, such as a game camera or other camera and/or motion detection sensor technology, for example, with wireless or wired technology, including 1G, 2(3, 3G, 4G, and LTE cellular, WiFi, radio, BLUETOOTH®, fiber-optic, coaxial cable, satellite, and internet, for example to alert a user or a service provider when a snake or other animal has become ensnared with the snare barrier 2, or that a limb or other object has fallen on and breached or otherwise compromised the snare barrier 2 potentially allowing animals to traverse the snare barrier 2. The netting sensor 46 may be powered by the user's AC line, and/or battery and/or photovoltaic cells, for example. The netting sensor may send an alert message directly to the user or a service provider, or the netting sensor may send an alert message to a receiver at the user's home, that may then alert the user to call the service provider or that may contact the user via wired or wireless technology.

In further embodiments where the snare barrier 2 is intended to function as a trap, rodent urine or other attractant for snakes or rodents maybe applied to or around or impregnated in the netting 4 or other part of the snare barrier 2. Additionally/or alternatively a reptile and or rodent repellent may be applied to or around or impregnated in the netting 4 or other part of the snare barrier 2, especially when the snare barrier 2 is intended to function as a barrier.

According to one embodiment, the netting 4 functions to entangle rodents and trap most reptiles. Lawn staple 39 ground attachments 36 may act to secure bottom edge 48 of netting 4 to the ground. Zip tie vertical attachments 34 may act to secure a top edge 50 of the netting 4 to the vertical support 32 such as an existing fence. Zip ties are preferable vertical attachments 34 for securing the netting to cyclone/chain-link and wrought iron fencing vertical support 32. If an existing fence 32 happens to be a wooden privacy fence, then a staple gun functions to attach staples 34 the top edge 50 of the netting to the fence 32.

One advantage of one embodiment of the snare barrier 2 is its ability to trap or deter varying size reptiles and rodents. Another advantage of one embodiment of the snare barrier 2 is its low visual impact because, for example, of the style of translucent and/or environment matching color of the netting 4 and its grid size/pattern with preferably thin netting cord 52 of preferably less than 1.5 mm in diameter and relatively large through hole 10, 12, 24, 26 of preferably at least ⅛ inches wide. The netting 4 design has deterring abilities as well as catching abilities.

Preferably the zip ties 34 and lawn staples 36 hold the netting 4 in a way that deters rodents that try to run or crawl through the netting 4 or reptiles that try to crawl or slither through.

The netting is preferably translucent (preferably plastic) and has a grid pattern designed to trap snakes and lizards of varying sizes and deter rodents from entering the protected area. Current technology will not necessarily capture smaller snakes or deter rodents like disclosed snare barrier 2. The different sized through holes 10, 12, 24, 26 of the first and second layers 6, 8 block and/or snare multiple sized rodents and reptiles. Where applicable, different sized through holes 10, 12, 24, 26 on third, and/or fourth (and/or fifth and/or sixth) layers 20, 22, for example, provide for effective snaring for a broad range of replies. A preferred embodiment of the snare barrier 2 has first, second, and third layers 6, 8, 20 attached to one another along the first seam 14, with the first layer 6 having largest through holes 10, the second layer 8 having medium through holes 12, and the third layer 20 having smallest through holes 24. The smallest snakes in a given environment pass through the first and second through holes 10, 12 and are snared by the netting 4 of the third through holes 24. Medium sized snakes in a given environment pass through the first through holes 10 and are snared by the netting 4 of the second through holes 12. The largest snakes in a given environment are snared by the netting 4 of the first through holes 10.

Lawn staples 39 are a simple and cost effective ground attachment 36, but other items such as tent stakes could be used. Zip ties are a simple, quick, and cost effective vertical attachment 34, but other items such as fishing line, rope, string, twist-ties etc. could be used. Zip ties additionally produce a very reliable hold between the netting 4 and the vertical support 32.

Using the snare barrier 2. To use the snare barrier, a user will preferably first assess the area to be protected by the snare barrier 2. This helps determine which setup will be needed. Three exemplary scenarios follow, but other embodiments of use are possible. Though the steps of the three scenarios are listed ordinally, and such order is preferable, the steps do not necessarily have to be done in the order listed.

THE FIRST SCENARIO is for using the snare barrier 2 with residential/commercial property with a cyclone/chain link fence 32. First, the user measures the linear feet in which the fence line runs or the area in which the user wishes to protect. Preferably the users use enough netting 4 material to cover the linear feet distance plus 2 ft. Panels are preferably 100 ft long, though other lengths are possible.

Second, the user will preferably ensure that the area along the outside of the user's fencing 32 has been cleared of debris and obstacles (weeds, rocks, etc.), as such debris and obstacles may diminish the effectiveness of the snare barrier 2.

Third, the user will unroll the netting 4 on the ground 38 in front of the fence line leaving approximately one linear foot of netting to the outside of each edge of the user's fence 32 for start and end points.

Fourth, the user will fold the netting along the first seam 14 by grabbing the edge furthest from the fence 32 and folding one time upward toward the edge closest to the fence 32 so the edges meet. When the user folds the netting 4, the larger through holes 10 of the netting 4 should be preferably facing away from the property the user is protecting (normally considered facing "out"), such as a house and/or yard, whereas the smaller through holes 12 of the netting 4 should preferably be facing toward the property the user is protecting, such as a house and/or yard, (normally considered facing "in"). This will allow smaller reptiles to pass through the first layer 6 and become caught in the second layer 8.

Fifth, beginning on one end, the user will grab the unfolded edges of the netting 4 closest to the fence 32, measure approximately one to one and a half feet up from the ground 38 and attach both edges with zip ties 34 to the fence 32, which will leave a remaining horizontal portion 42 of the netting 4 hanging loosely and the 1 ft overhang. Though zip ties are preferred, other vertical attachments 34 are possible, including wire, twine, glue, and tape.

Sixth, the user will continue attaching upper edges of the netting 4 to the fence 32 with zip ties 34 approximately every 6 ft, removing a majority of the netting 4 slack, until the full run is completed. In the event that the user has to use more than one section of netting 4 for the run, preferably the user will an overlap the two adjacent sections of netting by approximately 2 ft, securing the overlap vertically using zip ties, while also still leaving at least 1 ft overhang for the linear very end.

Seventh, once the upper edges of the net are fully attached and secured to the vertical support 32, the user will press the fold in the netting where the bottom of the fence 32 and the ground 38 meet, better defining the separate horizontal portion of the netting 42 and the vertical portion of the netting 40. There should be some netting 4 still lying flat on the ground 38 once this is complete—the horizontal portion of the netting 42. It is noted that too much tension on the vertical portion 20 of the netting 4 may make the snare barrier 2 less effective as a snare. The user should preferably make sure there is slack on the vertical portion of the netting 40 hanging down to the ground 38. Preferably, the netting 4 gives some with the animal/reptiles movement once the animal/reptiles have gone through the through holes 10, 12, 24, 26. This will cause the animal/reptiles to become entangled while trying to escape. If the netting 4 is pulled too tightly, the animal/reptile has the ability to free itself, decreasing its functioning as a snare.

Eighth, while maintaining the slack that the user created, the user will preferably begin on the end the user started from. Taking the 1 ft linear overhang left earlier and the lawn staples 39, stakes, weights 37 or other ground attachment 36 preferably provided, the user will roll that netting 4 section of linear overhang to secure any gaps the user may have between the house/structure and fence post 32 (or otherwise) at the starting area. The user will then secure the netting 4 to the ground 38 with lawn staples 39 or other ground attachment 34. Any spacing the user leaves between the netting 4 and the ground 38 may allow the animal/reptile to enter under the snare barrier 2 trap rather than sending the animal/reptile into it, so preferably there is no spacing in the run between the netting 4 and the ground 38 at that location.

Ninth, once the user has secured the starting corner, the user will preferably begin securing the netting 4 along the ground 38 with the lawn staples 39 approximately every 5 to 7 ft. The user should preferably follow the contour of the ground 38 and add additional lawn staples 39 or ground attachments 36 in low dips or places where an animal/reptile could slip under the netting 4. Although the user preferably has slack in the middle of the user's netting 4—that is, the transition between the horizontal portion 42 and the vertical portion 40, the bottom edge 48 of the netting is preferably stapled firmly along the ground 38 and is preferably be tight from side to side. In this embodiment, the first seam 14 is the bottom edge 48.

Tenth, once the user has reached the ending corner, the user will preferably repeat step 8, to ensure the netting 4 is securely attached to the ground 38. When the user has finished installing the snare barrier 2, the user will preferably spray the entire area adjacent to the snare barrier 2 with a grass/weed killer of the user's choosing to prevent overgrowth, which would potentially diminish the functionality of the snare barrier 2 system. The grass/weed killer will help ensure weeds and grass do not overcome the netting 4 and minimize its effectiveness by occupying the through holes 10, 12, 22, 24 in the netting 4. This will also help ensure the snare barrier 2 provides protection throughout an entire season. By contrast, using weed eater lawn tools to remove weeds could potentially tear the netting 4 material and damage the snare barrier 2.

THE SECOND SCENARIO is for using the snare barrier 2 with residential/commercial property with a wooden fence 32. First, the user measures the linear feet in which the fence 32 line runs or the area in which the user wishes to protect. The user should preferably ensure that the user has enough netting 4 material to cover the linear distance plus two feet. Panels of netting 4 are preferably 100 ft long.

Second, the user will preferably ensure that the area along the outside of the user's fencing 32 has been cleared of debris and obstacles (weeds, rocks, etc.).

Third, the user will unroll the netting 4 on the ground 38 in front of the fence line leaving approximately one foot of netting 4 to the outside of the edge of the user's fence 32 for each of start and end points.

Fourth, the user will fold the netting along the first seam 14 by grabbing the edge furthest from the fence 32 and folding one time upward toward the edge closest to the fence 32 so the edges meet. When the user folds the netting 4, the larger through holes 10 of the netting 4 should be preferably facing away from the property the user is protecting (normally considered facing "out"), whereas the smaller through holes 12 of the netting 4 should preferably be facing toward the property the user is protecting (normally considered facing "in"). This will allow smaller reptiles to pass through the first layer 6 and become caught in the second layer 8.

Fifth, beginning on one end, the user will grab the unfolded edges of the netting 4 closest to the fence 32, measure approximately one to one and a half feet up from the ground and staple 34 both edges with a staple gun to the fence 32 which will leave the remaining netting 4 hanging loosely and the one foot overhang. Though staples/staple gun are preferred vertical attachments 34 to use with wooden fences 32, other methods of securing are possible, including wire, twine, glue, and tape, nails, bards, screws and similar mechanical or chemical fasteners 34. The user will continue attaching upper edges of the netting 4 to the fence 32 approximately every three feet, removing the majority of the slack, until the user has completed the full run.

Sixth, in the event that the user has to use more than one section of netting 4 for the run, preferably the user will an overlap two adjacent sections of netting 4 by approximately two feet, and secure the overlapping portion—one netting to another—using zip ties, while also still leaving at least one linear foot overhang for the very end.

Seventh, once the upper edges 50 of the netting 4 are fully attached and secured to the fence 32, the user will press the fold in the netting where the bottom of the fence 32 and the ground 38 meet, better defining the separate horizontal portion of the netting 42 and the vertical portion of the netting 40. There should be some netting 4 still lying flat on the ground 38 once this is complete—the horizontal portion of the netting 42. It is noted that too much tension on the vertical portion 20 of the netting 4 may make the snare barrier 2 less effective as a snare. The user should preferably make sure there is slack on the vertical portion of the netting 40 hanging down to the ground 38. Preferably, the netting 4 gives some with the animal/reptiles movement once the animal/reptiles have gone through the through holes 10, 12, 24, 26. This will cause the animal/reptiles to become entangled while trying to escape. If the netting 4 is pulled too tightly, the animal/reptile has the ability to free itself, decreasing its functioning as a snare.

Eighth, while maintaining the slack that the user created, the user will preferably begin on the end the user started from. Taking the 1 ft linear overhang left earlier and the lawn staples 39, stakes, weights 37 or other ground attachment 36 preferably provided, the user will roll that netting 4 section of linear overhang to secure any gaps the user may have between the house/structure and fence post 32 (or otherwise) at the starting area. The user will then secure the netting 4 to the ground 38 with lawn staples 39 or other ground attachment 34. Any spacing the user leaves between the netting 4 and the ground 38 may allow the animal/reptile to enter under the snare barrier 2 trap rather than sending the animal/reptile into it, so preferably there is no spacing in the run between the netting 4 and the ground 38 at that location.

Ninth, once the user has secured the starting corner, the user will preferably begin securing the netting 4 along the ground 38 with the lawn staples 39 approximately every 5 to 7 ft. The user should preferably follow the contour of the ground 38 and add additional lawn staples 39 or ground attachments 36 in low dips or places where an animal/reptile could slip under the netting 4. Although the user preferably has slack in the middle of the user's netting 4—that is, the transition between the horizontal portion 42 and the vertical portion 40, the bottom edge 48 of the netting is preferably stapled firmly along the ground 38 and is preferably be tight from side to side. In this embodiment, the first seam 14 is the bottom edge 48.

Tenth, once the user has reached the ending corner, the user will preferably repeat step 8, to ensure the netting 4 is securely attached to the ground 38. When the user has finished installing the snare barrier 2, the user will preferably spray the entire area adjacent to the snare barrier 2 with a grass/weed killer of the user's choosing to prevent overgrowth, which would potentially diminish the functionality of the snare barrier 2 system. The grass/weed killer will help ensure weeds and grass do not overcome the netting 4 and minimize its effectiveness by occupying the through holes 10, 12, 22, 24 in the netting 4. This will also help ensure the snare barrier 2 provides protection throughout an entire season. By contrast, using weed eater lawn tools to remove weeds could potentially tear the netting 4 material and damage the snare barrier 2.

THE THIRD SCENARIO is for using the snare barrier 2 as a standalone snare barrier or trap, that is, where the netting 4 is not supported by a fence 32, for example. First, the user measures the linear feet in which the user wishes to protect. Preferably the user uses enough netting 4 material to cover the linear feet distance plus two feet. Netting 4 panels are preferably 100 ft long, though other lengths are possible.

Second, the user will preferably ensure that the area along and adjacent to where the snare barrier 2 will run is cleared of debris and obstacles (weeds, rocks, etc.).

Third, the user will unroll the netting 4 on the ground 38 to the user's desired start and end points.

Fourth, the user will fold the netting 4 along the first seam 14 by grabbing the edge furthest from area being protected and folding one time upward toward the edge closest to the area being protected so the edges meet. When the user folds the netting 4, the larger through holes 10 of the netting 4 should be preferably facing away from the property the user is protecting (normally considered facing "out"), whereas the smaller through holes 12 of the netting 4 should preferably be facing toward the property the user is protecting (normally considered facing "in"). This will allow smaller reptiles to pass through the first layer 6 and become caught in the second layer 8

Fifth, the folded edge or the first seam 14 should preferably be on the bottom edge 48 to ensure maximum coverage along the ground 38 where the lawn staples 39 or other ground attachments 36 are going to attach the netting 4 to the ground 38.

Sixth, starting on one linear end of the netting 4, the user will drive preferably half of a two to three foot wooden stake, or other vertical support 32, into the ground 38 approximately every 5-7 ft along the perimeter of the area the snare barrier 2 trap is set up in.

Seventh, once the user has placed the stakes or other vertical supports 32 in/on the ground, the user will start on one linear end of the netting 4 and pick the two separate edges up together and wrap them over the top of the stake or other vertical support 32. The user will preferably staple 34 or otherwise affix the netting 4 to the flat top of the stake 32. This will preferably be repeated for each or most stakes 32 the user has, preferably ensuring that the user has not pulled the netting 4 too tight. The user will preferably use moderate tension.

Eighth, to better attach pieces of netting 4, the user will preferably roll up the two separate pieces of netting 4 like a jellyroll or a cigarette before the user staples 34 the netting 4 on the top of the stake 32 (this will give the staple more grab on the netting and provide a more secure/longer-lasting hold).

Ninth, the user will then secure the netting 4 to the ground 38 with lawn staples 39 or other ground attachment 34. Any spacing the user leaves between the netting 4 and the ground 38 may allow the animal/reptile to enter under the snare barrier 2 trap rather than sending the animal/reptile into it, so preferably there is no spacing in the run between the netting 4 and the ground 38 at that location.

Tenth, once the user has secured the starting corner, the user will preferably begin securing the netting 4 along the ground 38 with the lawn staples 39 approximately every 5 to 7 ft. The user should preferably follow the contour of the ground 38 and add additional lawn staples 39 or ground attachments 36 in low dips or places where an animal/reptile could slip under the netting 4. Although the user preferably has slack in the middle of the user's netting 4—that is, the transition between the horizontal portion 42 and the vertical portion 40, the bottom edge 48 of the netting is preferably stapled firmly along the ground 38 and is preferably tight from side to side. In this embodiment, the first seam 14 is the bottom edge 48.

Eleventh, once the user has reached the ending corner, the user will preferably repeat step eight, to ensure the netting 4 is securely attached to the ground 38. When the user has finished installing the snare barrier 2, the user will preferably spray the entire area adjacent to the snare barrier 2 with a grass/weed killer of the user's choosing to prevent overgrowth, which would potentially diminish the functionality of the snare barrier 2 system. The grass/weed killer will help ensure weeds and grass do not overcome the netting 4 and minimize its effectiveness by occupying the through holes 10, 12, 22, 24 in the netting 4. This will also help ensure the snare barrier 2 provides protection throughout an entire season. By contrast, using weed eater lawn tools to remove weeds could potentially tear the netting 4 material and damage the snare barrier 2.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

We claim:

1. A land animal snare barrier comprising:
a netting having a first layer and a second layer, the netting being formed of plastic netting cord, and the netting being flexible under its own weight along substantially an entire length and width, and the netting being capable of being unrolled along the length and draped across a top of a vertical support, and the netting substantially conforming to a shape of the vertical support under its own weight after being draped thereupon;
the first layer defining a first plurality of through holes of a first size;
the second layer defining a second plurality of through holes of a second size;
wherein substantially all of the through holes in the first layer are larger than substantially all of the through holes in the second layer;
each layer having a seamed edge and an opposing free edge, with each free edge attached to a vertical support via a vertical attachment, with the vertical attachment extending through each layer; and
wherein the first layer and the second layer are substantially continuously attached to one another along a length of the netting at a seam along the seamed edges.

2. The snare barrier of claim 1 wherein the first size is at least 20% larger than the second size.

3. The snare barrier of claim 1 wherein the netting further comprises a third layer defining a third plurality of through holes of a third size.

4. The snare barrier of claim 3 wherein substantially all of the through holes of the second layer are larger than substantially all of the through holes of the third layer.

5. The snare barrier of claim 3 wherein the second layer is between the first layer and the third layer.

6. The snare barrier of claim 3 wherein the netting further comprises a fourth layer defining through holes of a fourth size.

7. The snare barrier of claim 6 wherein
substantially all of the through holes of the second layer are larger than substantially all of the through holes of the third layer;

substantially all of the through holes of the third layer are larger than substantially all of the through holes of the fourth layer;

the second layer is between the first layer and the third layer; and the third layer is between the second layer and the fourth layer.

8. The snare barrier of claim 6 wherein the first through holes are between 1 inch wide and ¾ inch wide;

the second through holes are between ¾ inch wide and ½ inch wide;

the third through holes are between ½ inch wide and ¼ inch wide; and the fourth through holes are between ¼ inch wide and ⅛ inch wide.

9. The snare barrier of claim 1 further comprising one or more vertical supports to attach to the netting.

10. The snare barrier of claim 1 further comprising one or more ground attachments to attach the netting to a ground surface.

11. The snare barrier of claim 1 wherein the netting is made from netting material that is one of substantially transparent and substantially translucent.

12. The snare barrier of claim 1 wherein the first layer and the second layer are each between 18 inches and 48 inches wide.

13. A land animal snare barrier kit comprising:

a netting having a first layer and a second layer, with the first layer defining first through holes of a first size, the second layer defining second through holes of a second size, and the first size being larger than the second size;

a vertical support; and a plurality of vertical attachments to attach the netting to the vertical support;

the netting being formed of plastic netting cord that is less than 1.5 mm in diameter, and the netting being flexible along substantially an entire length and width, and capable of being unrolled and draped across a top of a vertical support;

each layer having a seamed edge and an opposing free edge, with each free edge attached to the vertical support via the vertical attachment, with the vertical attachment extending through each layer; and the first layer and the second layer being substantially continuously connected to one another at a seam along the seamed edges.

14. The land animal snare barrier kit of claim 13 further comprising one or more ground attachments to attach the netting to a ground surface, and the first layer having a length and width substantially the same as a length and width of the second layer.

15. The land animal snare barrier kit of claim 14 wherein the one or more ground attachments is one of a weight, a lawn staple, and a stake.

16. The land animal snare barrier kit of claim 14 wherein the netting further comprises a third layer defining third through holes of a third size, and the second size being larger than the third size, and the first layer, the second layer, and the third layer being substantially continuously connected to one another at the seam.

17. The land animal snare barrier kit of claim 14 further comprising netting sensor that detects and transmits alerts when an animal is snared in the netting.

18. A method for blocking or snaring land animals comprising:

attaching a plastic flexible netting to a vertical support with vertical attachments along a perimeter to be protected;

wherein each layer has a seamed edge and an opposing free edge, with each free edge attached to the vertical support via the vertical attachments, with the vertical attachments extending through each layer;

wherein the netting has a first layer and a second layer substantially continuously attached to one another along a seam along the seamed edges, with the first layer defining first through holes of a first size, the second layer defining second through holes of a second size, and the first size being larger than the second size;

wherein the land animal is a snake and the snake is snared by the netting, and wherein the first layer and the second layer are adjacent to one another at multiple locations along a length and width of the layers.

* * * * *